Aug. 19, 1941.  S. M. LEVY  2,252,716
AUTOMOBILE VISOR AND REAR VISION MIRROR SUPPORT CONSTRUCTION
Filed July 1, 1940  2 Sheets-Sheet 1
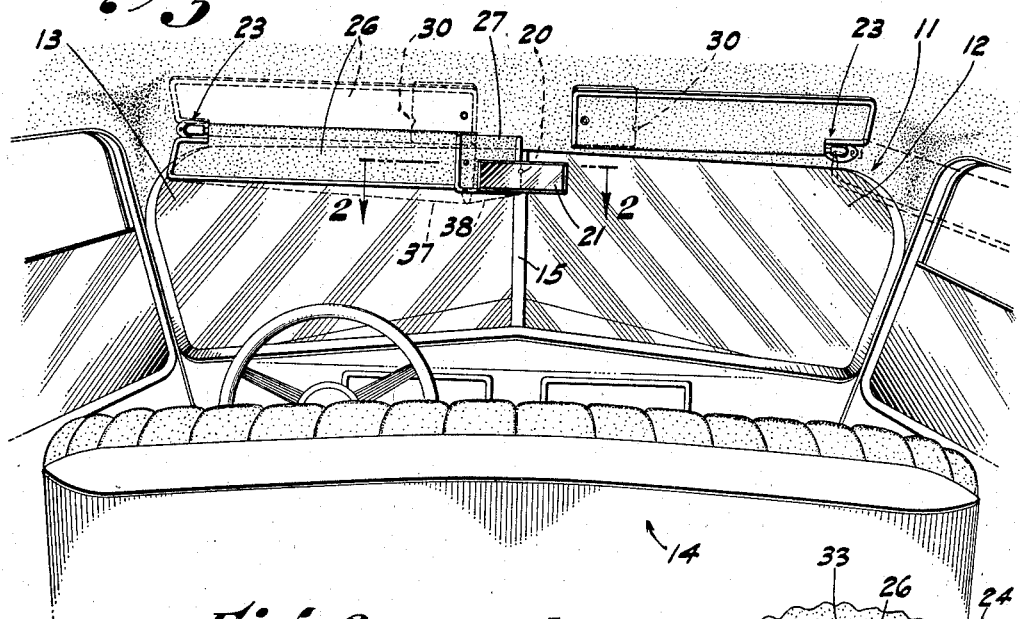
SOLOMON M. LEVY,
INVENTOR.

Aug. 19, 1941.   S. M. LEVY   2,252,716
AUTOMOBILE VISOR AND REAR VISION MIRROR SUPPORT CONSTRUCTION
Filed July 1, 1940   2 Sheets-Sheet 2
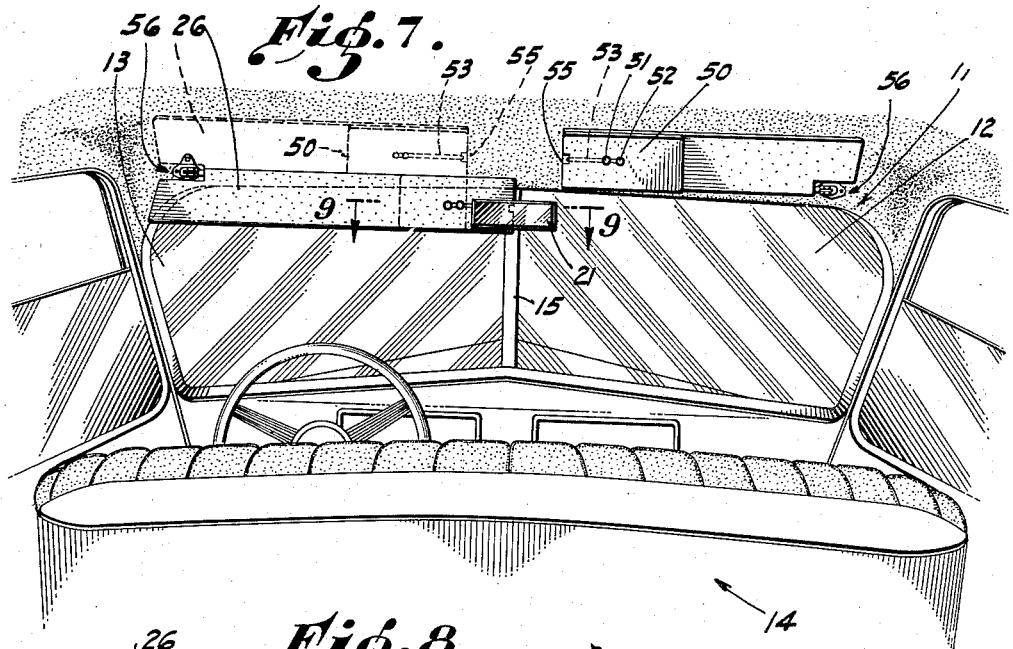
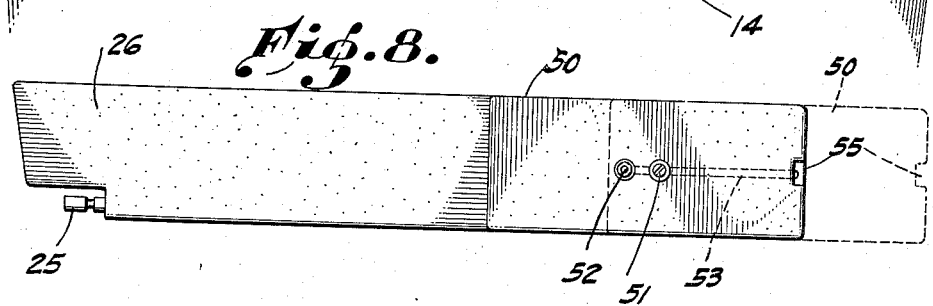
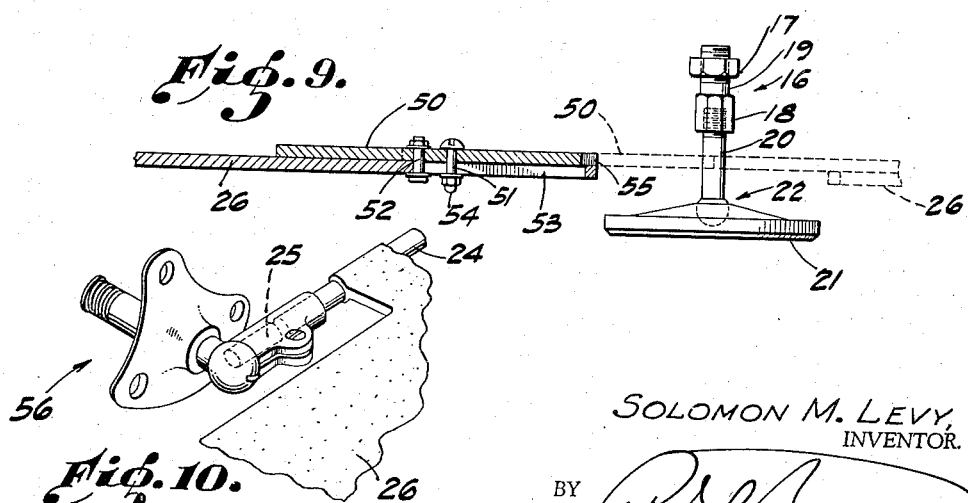
SOLOMON M. LEVY,
INVENTOR.
BY
ATTORNEY.

Patented Aug. 19, 1941

2,252,716

UNITED STATES PATENT OFFICE 2,252,716

AUTOMOBILE VISOR AND REAR VISION MIRROR SUPPORT CONSTRUCTION

Solomon M. Levy, Los Angeles, Calif., assignor to Inventions and Specialties, Inc., Los Angeles County, Calif., a corporation of California Application July 1, 1940, Serial No. 343,377

14 Claims. (Cl. 296—97)

My present invention relates to improvements in automobile sun visors wherein the visors and the rear vision mirror support are adapted to be cooperatively related in an improved manner.

In U. S. Patent #2,163,495, issued to me on June 20, 1939, I disclosed two mediums wherein a similar result was accomplished. It is among some of the more important objects of the invention to improve upon my patented construction by—

1. Pivotally or slidably combining the central sun visors and side visors and providing in the combination an adjustable extension having a way whereby the combined unit is partially supported at a point along their inner abutting edges by and with the shank of the rear vision mirror between them.

2. Providing a new and improved means for attaching the extensions to the main elongated glare shield members.

3. Providing detachable extensions which may be applied to the main visors and sold as a separate article of manufacture.

4. Providing an improved means for centering the extension on the main visor whereby the bottom edge of the extension is always in alinement with the edges of the main visor.

5. Providing for the use of cheaper materials to be used in the manufacture of the extensions without impairing the utility of the article.

6. Providing a novel extension for the shank of the rear vision mirror fastenable to the channel dividing the windshield whereby adequate play is afforded rearwardly of the rear vision mirror to operate the extensions and in turn permit of the adjusting of the mirror through a wider range of angles.

7. Greatly simplifying the construction by reducing the number of parts and in turn the cost of manufacture, and to, 8. In general improve upon the combination stated wherein less wear, greater efficiency, and ease of operation is attained.

Referring to the accompanying drawings forming a part of this specification wherein are generically shown preferred embodiments of the invention;

Fig. 1 is a perspective view looking from a point rearwardly of the driver's seat toward the windshield of an automobile with my improvement. In said view, the devices at the right and left are shown respectively in the unused position in dotted and full lines, and at the left only the device shown in the unused position in dotted lines is shown in the used position in full lines. In the latter position a dotted indication illustrates one step in the operation.

Fig. 2 is a section taken on line 2—2 looking in the direction indicated by the arrows in Fig. 1.

Fig. 3 is a view of a visor per se similar to the main visor shown in full lines at the left in Fig. 1 with a portion thereof broken away to disclose interior construction. To said visor is applied a modified extension, such extension being shown in retracted and extended positions in dotted and full lines.

Fig. 4 is a perspective view of the extension shown in Fig. 3 on an increased scale.

Fig. 5 is a section taken on line 5—5 of Fig. 4.

Fig. 6 is a fragmentary, sectional, perspective view showing a conventional mounting for the main visors.

Fig. 7 is a view similar to Fig. 1 showing a further generic modification of a glare shield extension.

Fig. 8 is a view looking from a point rearwardly of the driver's seat toward the combination visor and extension per se dottedly shown at the left in Fig. 7. In Fig. 8 the dotted indication shows the extension as it would appear when extended to an operative position.

Fig. 9 is a section taken on line 9—9 of Fig. 7, the dotted indication illustrating the cooperative relationship of the extensions with the shank of the rear vision mirror, and, Fig. 10 is a fragmentary perspective view of a mounting means for the main or combination visors shown in Fig. 7.

Referring in detail to the drawings and first particularly to the embodiment shown in Figs. 1 and 2, which embodiment comprises a V-shaped windshield 11 having a pane 12 at the right and a pane 13 at the left, united at the center of the automobile 14 by a channeled member 15. Into the member 15 is screwed one end of the rear vision mirror extension 16; see Figs. 2 and 9; and a lock nut 17 is provided for securing said extension in the fully applied position.

The extension 16 may be said to comprise an internally threaded thimble portion 18, and an exteriorly threaded shank portion 19. Into the thimble portion is screwed the threaded shank 20 of the rear vision mirror 21, said mirror and shank being cooperatively related through the medium of the ball and socket joint 22.

Through the use of the thimble extension 16 several distinct advantages are gained. It advances the rear vision mirror forwardly in relation to the driver making it more accessible for manipulation. It permits of added space between the mirror and windshield for the visor extensions, presently to be described, to be brought into and out of a cooperative relationship with the shank of the rear vision mirror, and it permits adjusting the rear vision mirror through a greater angular range when the latter is swung in a horizontal plane about its pivotal support. By referring to Figs. 2 and 9 it will be noted this angular range of adjustment is made greater when the extension occupies a position in rear of the main visor, as shown in Fig. 9, rather than in front thereof as shown in Fig. 2. Automobiles are now sold with the type of rear vision mirror shown, but the threaded shank 20 is screwed directly into the canneled member. Unless the mirror is extended it is impractical to employ the main visor supported extension in the capacity shown.

In order to shut out more effectively the glare entering through the windshield in the area in and about the rear vision mirror my improved visor and rear vision mirror support construction as shown in Fig. 1 comprises a main elongated glare shield member 26 and a shorter elongated glare shield member or extension 27 pivoted to said main member. Said extension is shown located forwardly of the main member or visor when in the operative position although this positioning of the extension on the main visor is considered an elective measure. The pivoted construction as shown in Fig. 2 comprises a bolt and washer construction that pertains to the extension only and its workable fit in relation to the bolt and washer is similar to the construction seen at the left of Fig. 5.

The bolt 29 is located adjacent the inner edge of the visor 26 at the half-way point. Thus the horizontal leatherette binding edge of the extension when in the operative position is brought into alinement with the leatherette binding edge of the main visor. The extension 27 has a full 360 degree swing and a working swing of 180 degrees.

A notch 30 is provided at a point preferably mid-way of the visor in its inner edge, when the extension is in the operative position, into which half the shank of the rear vision mirror extends and is nested. This feature is generic to the several embodiments set forth and provides a rest for the inmost end of the combination visor which prevents sag of the visor occasioned by the added weight of the extension due to vibration of the vehicle caused by travelling on rough or uneven terrain when encountering dips and bumps.

The notch 30 also permits the inmost vertical edge of each visor to be brought into contiguity with exact nicety between which no glare can pass without any overlapping and without subjecting the leatherette binding edge to wear as would be occasioned were the main visor and extension one. This feature will be amplified further in the description of the operation which follows later on.

Means 23, shown in Fig. 6, is provided to pivotally mount the outer end portion of each main visor in an upper front corner of the automobile 14 adjacent a windshield pane.

Means 23, having been described and claimed in the patent supra this construction will not be described in detail, but may be said to include briefly the rod 24 having a projecting end portion 25; plates 31 and 32, bolts 33 for fastening the plates to the frame of the automobile, a bolt 34 having a ball head 35 mounted between the plates, and a body member 36 to which the projecting end portion 25 and bolt 34 are joined.

In providing the aperture 30 whereby the inner end of the visor may rest on the rear vision mirror shank, plates 31 and 32 may have a lesser friction tight working fit with the ball head than were friction between the parts relied upon entirely to support the combination visor in the operative position. Ball 35 permits of swinging the visor thereabout in a plane at right angles to the longitudinal axis of the automobile. Thus visor 26 when in full line operative position at the left of Fig. 1 may be swung to the dotted position 37. In such position extension 27 may be swung counterclockwisely about its pivot to the dotted position 38, in which position the entire unit may be swung about the ball 35 bringing the mouth of the notch into registry with the shank 20. Applying manual pressure at the intersecting point of the dotted lines 37 and 38 at the bottom, the upper edges of the visor and extension may be brought into parallelism and the inmost edge of the extension in turn made to assume a vertical position.

To release the visor extension from the shank 20, manual pressure on either the top or bottom edge of the visor opposite the pivotal point 29 will unseat the shank from the aperture whence the extension can be rotated through an angle of 180 degrees to the position shown when the visor is in the inoperative position.

It will be observed when the visor 26 is rotated to exclude sun glare at the side of the machine as dottedly indicated at the right in Fig. 1, with the extension rotated to the operative position, the occupants in the tonneau of the car will be more effectively shielded from the sun's rays.

In the modification shown in Figs. 3, 4 and 5, the operation is the same as that previously related, the only difference being in the manner in which the extension is attached to the main visor.

In said modification the extension 40 is shown provided with notch 41 to engage with the shank 20. The extension is provided with a pair of resilient clamps 42 and 43 by means of which the extension is detachably connected to the visor 26. Said clamps have an aperture in one end, such ends being assembled in a superposed relation, and mounted upon a pivot bolt 44, which extends through the extension 40 as shown in Fig. 5 and is similar in construction to that described in regard to the extension 27. The clamps are provided at their opposite ends with inturned goose-neck clips 45 which are springable so as to slip over the edge of the visor in which the rod 24 is housed to be fixedly held thereby. The pivot 44 is located in extension 40 adjacent the edge which is opposite the notch 41 at the half-way-point of the extension.

Visors 26 come in different sizes but by varying the spread of the clips 45 the pivot point 44 may be raised or lowered in order for the leatherette binding edges to properly aline as shown in Fig. 3.

In Figs. 7, 8 and 9 is shown another modification of a visor extension and in Fig. 10 is shown a mounting for the main visor which is different than the mounting means shown in Fig. 6, but per se is considered not to constitute a part of the present invention. The parts in the several figures which are similar to those previously described will be lettered the same.

The invention provided by this embodiment of the invention comprises a wing 50 provided with a pair of spaced bolts 51 and 52 extending therethrough which travel in a horizontally extending slot 53 in the main visor 26, the bolt 51 or shank 20 limiting the travel of the extension in one direction and the bolt 52 limiting the travel of the extension in the opposite direction.

Bolts 51 and 52 maintain parallelism of the horizontal edges of the extension 50 and visor 26, and bolt 51 is provided with a nut 54 made manually accessible to the driver when the visor is rotated to sun obstructing position whereby said extension can be manipulated to operative and inoperative positions.

Extension 50 like the others is provided with a notch 55 to engage with the shank 20 of the rear vision mirror when the extension is shifted to the operative position as shown in Fig. 9 similarly to the extensions already described with the exception that extension 50 reciprocates in a straight line whereas extensions 27 and 40 operate on a pivot.

Means 56 shows a form of mounting for the embodiment just described.

In the operation of the visor 26 and extension 50 the combined unit is rotated from dotted line position at left in Fig. 7 to the full line position therebelow. The nut 54 is then manually grasped and the extension is moved rightwardly until at least half the shank 20 is nested in the notch 55. Since the right hand visor is constructed in each instance the same as the left hand visor, except as to hand, its manner of operation will be clear.

It should be understood that the present disclosure is for the purpose of illustration only and that this invention includes all modifications and equivalents which fall within the scope of the subject matter claimed.

I claim:

1. In a structure of the kind described, the combination with a vehicle having a double pane windshield mounted thereon, a channeled member separating the right hand pane from the left hand pane, and a rear vision mirror located in a rearwardly spaced relation to the central portion of said windshield having a supporting shank fastened to said channeled member; of a pair of main elongated glare shield members, means for pivotally mounting one end portion of each of said members upon the frame of an automobile adjacent to an upper corner of each pane of said windshield, an extension comprising a shorter glare shield member adjustably mounted to each said main elongated glare shield member, each of said extensions being provided with a notch in their free end edge portion which in their operative positions are directed toward each other, said extensions being manually manipulative upon said main glare shield members whereby adjacent edges of each visor extension are brought into a contiguous relation, with the shank of said mirror nested in the notched portion thereof.

2. In a structure of the kind described, the combination with an automobile having a windshield mounted thereon, a channeled member dividing said windshield in two parts, and a rear vision mirror located in a rearwardly spaced relation to the central portion of said windshield having a supporting shank fastened to said channeled member, of a pair of main elongated glare shield members, means for pivotally mounting one end portion of each of said members upon the frame of said automobile adjacent to an upper corner of said windshield, and an extension comprising a shorter elongated glare shield member pivotally mounted to each said main shield member and having a free edge portion rotative into a contiguous relation, with the shank occupying a position between them.

3. In a structure of the kind described, the combination with an automobile having a V-type windshield mounted thereon, a channeled member dividing said windshield in two parts, an extension secured to said channeled member, and a rear vision mirror having a supporting shank fastened to said extension; of a pair of main elongated glare shield members, means for pivotally mounting one end portion of each of said members upon the frame of said automobile adjacent to an upper corner of said windshield, and an extension comprising a shorter elongated glare shield member adjustably mounted to each said main shield member and having a free edge portion movable into a contiguous relation, with said shank occupying a position between them.

4. In a structure of the kind described, the combination with an automobile having a V-type windshield mounted thereon, a channeled member dividing said windshield in two parts, an extension secured to said channeled member, and a rear vision mirror having a supporting shank fastened to said extension; of a pair of main elongated glare shield members, means for pivotally mounting one end portion of each of said members upon the frame of said automobile adjacent to an upper corner of said windshield, an extension comprising a shorter elongated glare shield member, and means detachably mounting said extensions to said main shield members whereby certain edges thereof are movable into a contiguous relation, with said shank occupying a position between them.

5. The subject matter of claim 4 and, said detachable mounting comprising a pair of clips.

6. The subject matter of claim 4 and, said detachable mounting comprising a pair of clips having a common pivotal axis fastened to said extension.

7. The subject matter of claim 4 and, said detachable mounting comprising a pair of spreadable clips having a common axis of support fastened to said extension, said clips being engageable with one of the longitudinal edges of said main shield members.

8. In a structure of the kind described, the combination with an automobile having a V-type windshield mounted thereon, a channeled member dividing said windshield in two parts, an extension secured to said channeled member, and a rear vision mirror having a supporting shank fastened to said extension, of a pair of main elongated glare shield members, means for pivotally mounting one end portion of each of said members upon the frame of said automobile adjacent to an upper corner of said windshield, an extension comprising a shorter elongated glare shield member, and means mounting said extensions to said main shield members whereby certain edges thereof are slidably movable from a non-contiguous relation to a contiguous relation wherein said shank occupies a position between them.

9. In a structure of the kind described, an automobile having a windshield mounted thereon, a channeled member dividing said windshield in two parts, an extension screwed into said channeled member, a rear vision mirror having a supporting shank fastened to said extension, a pair of main elongated glare shield members, means for pivotally mounting one end portion of each of said members upon the frame of said automobile adjacent to an upper corner of said windshield, an extension comprising a shorter elongated glare shield member mounted to each said main shield member, each of said extensions being provided with a notch in their free end edge portions which in their operative positions are directed toward each other, said extensions being manually manipulative upon said main glare shield members whereby adjacent edges of each extension are movable into a contiguous relation with each other with the shank of said mirror nested within their notched portions.

10. In a structure of the kind described in combination, an automobile having a V-type windshield mounted thereon, a channel dividing said windshield in two parts, an extension fastened to said channeled member, a rear vision mirror having a supporting shank fastened to said extension, a pair of main elongated glare shield members, means for pivotally mounting one end portion of each of said members upon the frame of said automobile adjacent to an upper corner of said windshield, an extension comprising a shorter elongated glare shield member mounted to each said main shield member, said extensions being manually manipulative whereby certain edges of said extensions are movable into a contiguous relation about the shank of said mirror.

11. In a structure of the kind described, the combination with an automobile having a windshield mounted thereon, of a pair of main elongated glare shield members, means for pivotally mounting one end portion of each of said members upon the frame of said automobile adjacent to an upper corner of said windshield, and an extension comprising an elongated glare shield member shorter than said main shield member pivotally mounted to each said main shield member to occupy an overlapping relation therewith when said extensions are in the inoperative position, in which position spaces intervene between adjacent opposite edges of both said shields and said extensions whereby they may swing freely of a rear vision mirror mounted centrally of said automobile which said combination of shields must travel by when the main shield member is rotated from an inoperative position to a sun glare obstructing position, said extensions when swung with said main shield members to the latter position being each rotative inwardly about their pivotal supports toward the mid-length of the automobile from said overlapping position to a non-overlapping position bringing certain edges thereof into a contiguous relation to fill the gap between adjacent edges of said main shield members rearwardly of said mirror.

12. As an article of manufacture, an extension for a conventional automobile visor of the kind described comprising an elongated plate-like member provided with a pair of superposed arms having a common pivotal support, said support extending through said extension and providing a pivotal mounting therefor, said arms each being provided with a springable clip for detachably fastening it to an edge portion of said visor.

13. The subject matter of claim 12 and, said clips comprising end portions of said arms bent laterally and back thereupon toward the side thereof which is farthest from said extension.

14. The subject matter of claim 12 and, said arms being angularly adjustable rightwardly and leftwardly to vary the angle between them whereby to move their pivotal support perpendicularly in either an up or down direction to bring the longitudinally extending edges of said extension into alinement with the longitudinally extending edges of said visor.

SOLOMON M. LEVY.